(12) United States Patent
Naik et al.

(10) Patent No.: US 12,585,778 B2
(45) Date of Patent: Mar. 24, 2026

(54) SELF-VERSION VERIFICATION FOR SHARED LIBRARIES

(71) Applicant: Arista Networks, Inc., Santa Clara, CA (US)

(72) Inventors: Ishwar Naik, Bangalore (IN); Kaustav Majumdar, Bangalore (IN); Manish Singhvi, Bangalore (IN); Sourav Basu, Bangalore (IN); Ethan Rahn, Agoura Hills, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 172 days.

(21) Appl. No.: 18/743,555

(22) Filed: Jun. 14, 2024

(65) Prior Publication Data

US 2025/0384136 A1 Dec. 18, 2025

(51) Int. Cl.
*G06F 21/57* (2013.01)
*G06F 8/61* (2018.01)
*H04L 9/32* (2006.01)

(52) U.S. Cl.
CPC .............. *G06F 21/572* (2013.01); *G06F 8/61* (2013.01); *H04L 9/3242* (2013.01); *G06F 2221/033* (2013.01)

(58) Field of Classification Search
CPC .... G06F 21/572; G06F 8/61; G06F 2221/033; H04L 9/3242
See application file for complete search history.

(56) References Cited

U.S. PATENT DOCUMENTS

| | | | | |
|---|---|---|---|---|
| 6,353,928 B1* | 3/2002 | Altberg | ..................... | G06F 8/61 |
| | | | | 719/331 |
| 6,631,521 B1* | 10/2003 | Curtis | ........................ | G06F 8/62 |
| | | | | 717/169 |
| 10,454,674 B1* | 10/2019 | Bar-El | ................... | H04L 63/123 |
| 10,564,959 B2* | 2/2020 | Kennedy | ................... | G06F 8/71 |
| 2004/0230949 A1* | 11/2004 | Talwar | .................... | G06F 21/52 |
| | | | | 718/1 |
| 2015/0347173 A1* | 12/2015 | Shen | ..................... | G06F 9/5077 |
| | | | | 718/1 |
| 2015/0355899 A1* | 12/2015 | Agarwal | ................... | G06F 8/65 |
| | | | | 717/170 |
| 2018/0150287 A1* | 5/2018 | Del Sordo | .......... | G06F 9/44521 |
| 2018/0267796 A1* | 9/2018 | Kennedy | ................... | G06F 8/61 |
| 2024/0256428 A1* | 8/2024 | Huang | ................. | G06F 11/362 |

\* cited by examiner

*Primary Examiner* — Cheng-Feng Huang

(74) *Attorney, Agent, or Firm* — Fountainhead Law Group, PC

(57) ABSTRACT

Techniques that enable a shared library to perform self-version verification at the time of being dynamically loaded by a software application are provided. Self-version verification in this context refers to the process of verifying by the shared library that it is the library version the software application intends to use, without any intervention or involvement by the application.

20 Claims, 4 Drawing Sheets

COMPUTING DEVICE 100

CENTRAL PROCESSING UNIT (CPU)
102

NONVOLATILE STORAGE 106

LIB.SO.1 (EMBODYING VERSION 1 OF SHARED LIBRARY LIB)
108

APPLICATION A
118

MAIN MEMORY
104

200

202 — User launches application executable of application A

204 — The application executable initiates a process for dynamically loading LIB.so.1

206 — As part of the dynamic loading process, a constructor function of LIB.so.1 is called 208 — Upon completion of the constructor function, the application executable proceeds with its normal operation and uses LIB.so.1 as needed End

SELF-VERSION VERIFICATION FOR SHARED LIBRARIES

BACKGROUND

In computing, shared libraries are collections of executable (compiled) code that can be used by multiple software applications at runtime. A shared library is embodied in a file containing the library code, such as a ".so" (shared object) file on Unix systems and a ".dll" (dynamic link library) file on Windows systems.

Each software application that uses a shared library includes references to the library code, but not the library code itself, in the application's executable file (i.e., application executable). When the application executable is run, the shared library is dynamically loaded, which means that the shared library is placed into system memory and its code is mapped to the corresponding references in the application executable. Once this dynamic loading process is complete, the application executable can use (e.g., call) the shared library as if it were part of the application executable's own code.

In software development, shared libraries provide numerous benefits such as memory efficiency, code reusability, and language independence. However, it also introduces the challenge of managing library versions. For example, if a software application is designed to use one version of a shared library but erroneously loads another version, the application may exhibit undesired behavior.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and details are set forth in order to provide an understanding of embodiments of the present disclosure. Particular embodiments as expressed in the claims may include some or all of the features in these examples, alone or in combination with other features described below, and may further include modifications and equivalents of the features and concepts described herein.

The present disclosure describes techniques that enable a shared library to perform self-version verification at the time of being dynamically loaded by a software application. "Self-version verification" refers to the process of verifying by the shared library that it is the library version the software application intends to use, without any intervention or involvement by the application.

1. Example Computing Device and Solution Overview

Figure 1:
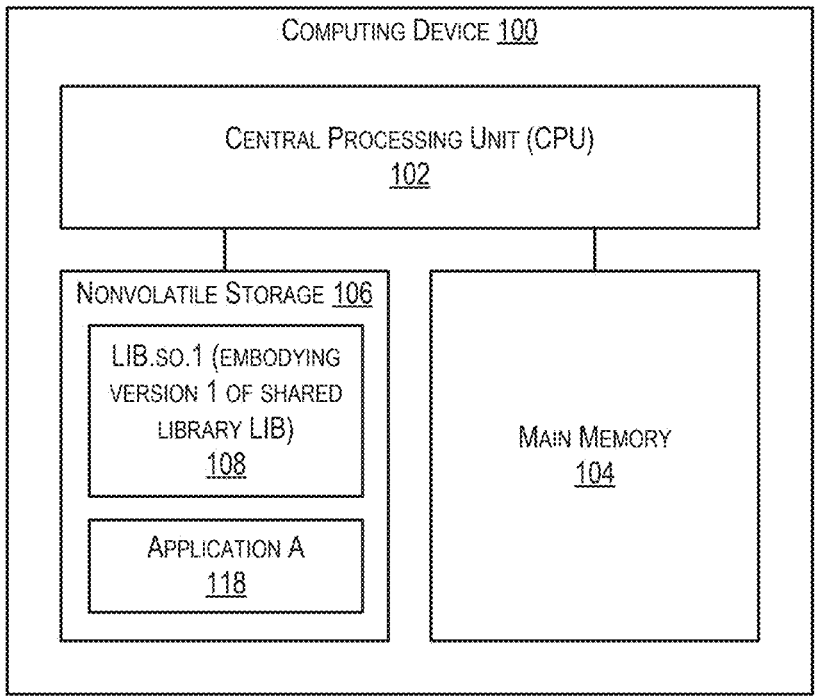
FIG. 1 depicts an example computing device in accordance with certain embodiments of the present disclosure.

FIG. 1 depicts a simplified block diagram of an example computing device 100 in which the techniques of the present disclosure may be implemented. In certain embodiments, computing device 100 may be a general-purpose computing device such as a personal computer, a server computer, a smartphone, a tablet, etc. In other embodiments, computing device 100 may be a specialized computing device such as a network device (e.g., switch or router), an embedded system, or the like.

As shown, computing device 100 includes a central processing unit (CPU) 102 that is coupled with a main (system) memory 104 and a nonvolatile storage 106. In addition, computing device 100 maintains on nonvolatile storage 106 a shared library file "LIB.so.1" that embodies a version "1" of a shared library "LIB" (reference numeral 108) and a software application "A" (reference numeral 110) that is designed to use this particular version of shared library LIB (hereafter referred to as "LIB v1"). For example, LIB v1 may implement a set of cryptographic functions (e.g., encrypt, decrypt, etc.) and application A may be a program that calls these cryptographic functions as part of its runtime operation.

Figure 2:
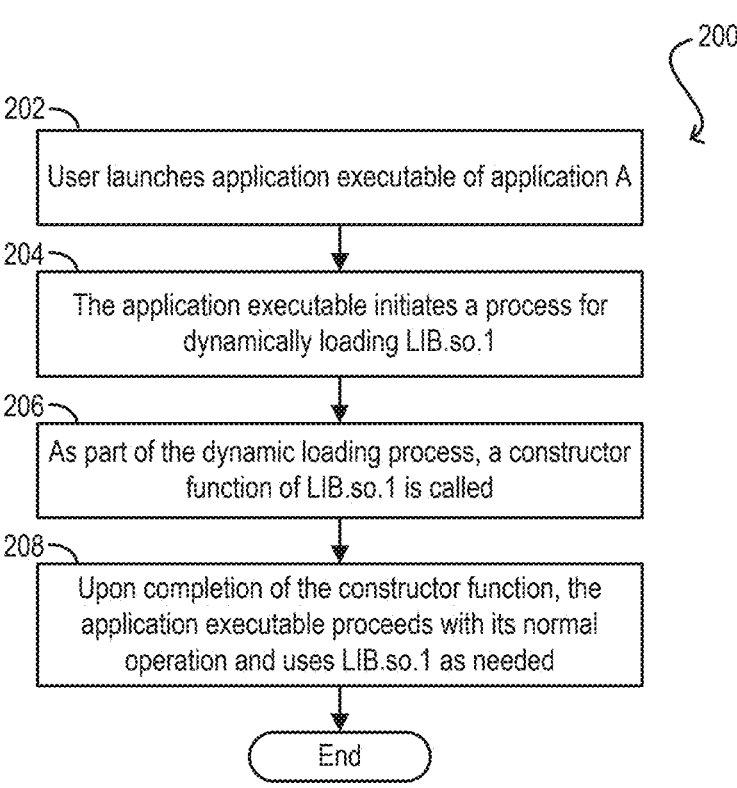
FIG. 2 depicts a workflow for enabling use of a shared library by an application in accordance with certain embodiments of the present disclosure.

FIG. 2 is a flowchart 200 illustrating a conventional process by which application A is enabled to use LIB v1 at runtime. Flowchart 200 assumes that the application executable of application A has been built with references to the executable/compiled code included in LIB.so.1, such as calls to one or more functions of LIB v1.

Starting with step 202 of flowchart 200, a user of computing device 100 launches application A's application executable, which causes the application executable to be loaded into main memory 104 and run by CPU 102.

At step 204, the application executable initiates a process for dynamically loading LIB v1 (or more precisely, shared library file LIB.so.1 embodying LIB v1) so that it can be used during the runtime of the application. This process is typically carried out by a dynamic loader/linker of computing device 100's operating system (OS) and generally involves retrieving LIB.so.1 from its location on nonvolatile storage 106, placing the retrieved shared library file in main memory 104 (if it is not already present there), and mapping the code of LIB.so.1 to the references in the application executable, thereby matching the library functions and variables needed by application A with the corresponding definitions in the shared library file. In one set of embodiments, the application executable can initiate the dynamic loading at step 204 in an implicit manner by including LIB.so.1 in a "dynamic" or "import" section of the executable, which is found and processed by the dynamic loader/linker. Alternatively, the application executable can initiate the dynamic loading in an explicit manner by invoking a dynamic loading function (such as the "dlopen" function on Unix systems) and specifying LIB.so.1 as the shared library file to be loaded.

At step 206, as part of the dynamic loading process, the dynamic linker/loader calls a constructor function included in LIB.so.1. This constructor function is a special function that is executed before any other function of LIB.so.1 and is intended to perform various initialization tasks with respect to the shared library, such as setting up global state or other needed resources.

Finally, upon completion of the constructor function, the dynamic loading of LIB.so.1 is considered successful. Accordingly, the application executable proceeds with its normal operation and uses (e.g., calls) LIB.so.1 as needed (step 208).

As mentioned in the Background section, while shared libraries provide several useful benefits, they also require some mechanism to ensure that the correct shared library version is dynamically loaded by a given application. For instance, with respect to FIG. 1, there may be a scenario in which shared library file LIB.so.1 is accidentally or intentionally replaced with an identically-named file that corresponds to a different version of shared library LIB (e.g., LIB v2 instead of version LIB v1). In this scenario, without any version check mechanism in place, application A will load the wrong version of LIB, which may result in unexpected, erroneous, or potentially malicious behavior.

One solution for the foregoing issue is for application A to store a hash-based message authentication code (HMAC) of shared library file LIB.so.1 (where this stored HMAC identifies the correct/expected version of the file, or in other words the version containing the code for LIB v1) and upon retrieving LIB.so.1 from nonvolatile storage 106, compute an HMAC of the retrieved file and verify that this computed (i.e., actual) HMAC matches the stored (i.e., expected) HMAC. As known in the art, an HMAC is a type of message authentication code that uses a hash function and a secret key to enable verification of the integrity and authenticity of a message. If the two HMACs match, application A can be confident that the retrieved file embodies the shared library version that the application intends to use and thus can proceed with the dynamic loading process at step 204 of flowchart 200.

However, this solution is not ideal because it requires the application itself to store the expected HMAC of every shared library that it uses and to perform the HMAC check noted above for each such library. While this overhead may be acceptable for applications that make use of a relatively small number of shared libraries, it quickly becomes burdensome for larger applications that make use of dozens (or more) of shared libraries.

To address the foregoing and other similar problems, embodiments of the present disclosure provide techniques that enable a shared library to perform self-version verification, or in other words autonomously verify that it is the library version expected by an application that uses it. This self-version verification is achieved via two workflows: a build-time workflow that is performed at the time of building the application and a runtime workflow is performed at the time the shared library is dynamically loaded by the application.

At a high level, the build-time workflow involves (1) building/compiling a shared library file that embodies the version of the shared library used by the application, where the shared library file includes self-version verification logic in its constructor function (explained below); (2) computing an HMAC of the shared library file using a hash function and a security key associated with the shared library version; (3) causing the computed HMAC to be deployed at a predefined HMAC path on a target device where the application is or will be installed; and (4) causing the shared library file to be deployed at predefined library path on that target device. For instance, with respect to application A of FIG. 1, this build-time workflow can comprise building/compiling shared library file LIB.so.1 (which embodies LIB v1 used by application A), computing an HMAC of LIB.so.1 (called HMAC-LIBv1), causing HMAC-LIBv1 to be deployed at a predefined HMAC path "/etc/" on nonvolatile storage 106 of computing device 100 (which is the target device where application A is/will be installed), and causing LIB.so.1 to be deployed at a predefined library path "/lib64/" on nonvolatile storage 106 of computing device 100.

The runtime workflow generally involves, at time of running the application on the target device, dynamically loading the shared library file from the predefined library path on the target device and executing the self-version verification logic included in the shared library file's constructor function, where this self-version verification logic comprises computing an HMAC of the shared library file using the same hash function and security key used at step 2 of the build-time workflow and comparing the computed HMAC to the HMAC present at the predefined HMAC path on the target device. For instance, continuing with the example above regarding application A, the self-version verification logic can comprise computing an HMAC of the shared library LIB.so.1 stored at predefined library path/lib64/on nonvolatile storage 106 of computing device 100 (i.e., the target device) and comparing the computed HMAC to HMAC-LIBv1 present at predefined HMAC path/etc/on nonvolatile storage 106.

If the two HMACs are the same (which will be the case if the shared library file being loaded is identical to the shared library file originally created during the build-time workflow), the self-version verification logic can conclude that the shared library file is the correct version expected by the application and can allow the constructor function (and thus the dynamic loading process) to complete successfully. However, if the two HMACs are not the same (which will be the case if the shared library file being loaded is different from the shared library file created during the build-time workflow), the self-version verification logic can conclude that the shared library file is not the correct version expected by the application and can throw an error or otherwise prevent the file from being successfully loaded. In this way, the self-version verification logic can ensure that the application does not erroneously load and use an incorrect shared library version.

Significantly, because the self-version verification logic is entirely contained within the shared library file's constructor function, the application loading the library is not involved at all in the version verification process; the shared library executes this logic entirely on its own (i.e., autonomously). Accordingly, this approach eliminates the need for the application to maintain and track the HMACs of all of the shared libraries that it uses, resulting in a scalable and efficient solution.

The remaining sections of the present disclosure provide further details regarding the build time and runtime workflows discussed above, as well as an explanation of how this solution works in scenarios where multiple applications that use the same shared library version (or different versions of the same shared library) are installed on the same target device. It should be appreciated that FIGS. 1 and 2 and the foregoing high-level solution description are illustrative and not intended to limit embodiments of the present disclosure. For example, while the foregoing description focuses on the use of HMACs for performing self-version verification, in alternative embodiments other types of cryptographic primitives or mathematical digests that enable data integrity checking, such as digital signatures or simple hashes, may be employed. HMACs are useful because they are relatively easy to implement and ensure both data integrity and authenticity (i.e., guarantee that the expected HMAC was computed by a trusted entity that knows a secret key).

Further, while the foregoing description uses the term "application" to refer to component 110 in FIG. 1 that makes use of shared library file LIB.so.1, this application may itself be a shared library that is used by another application or library.

2. Build-Time Workflow

Figure 3:
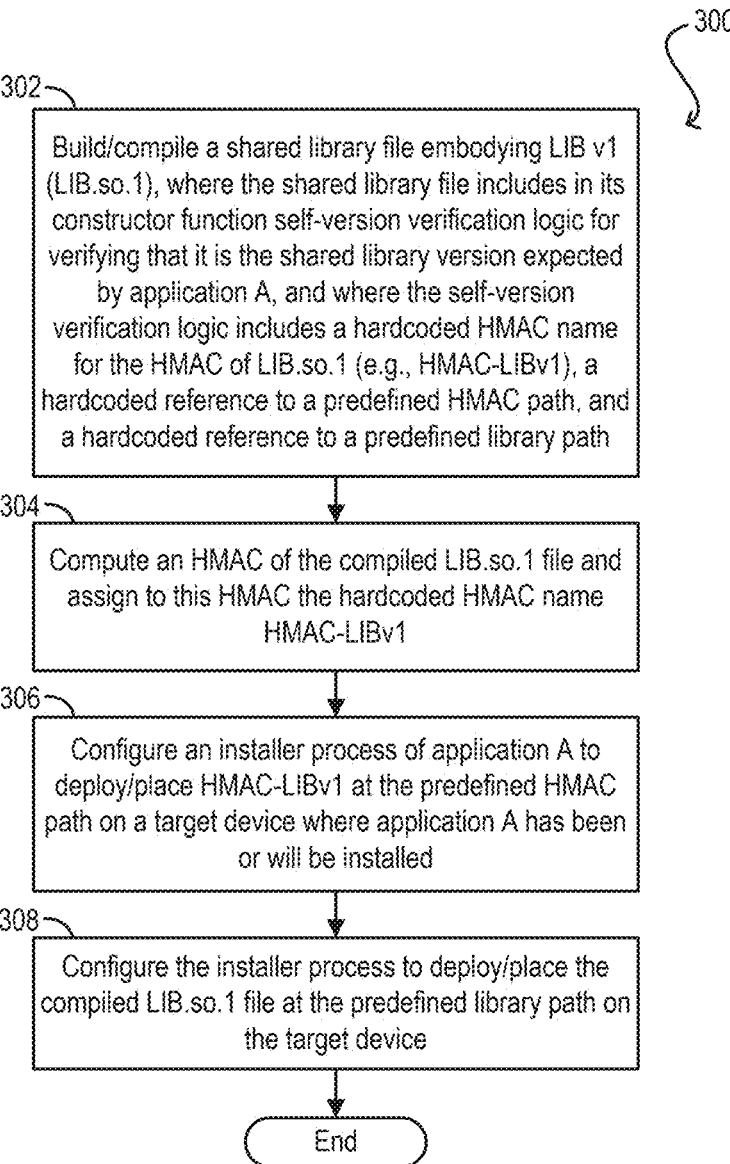
FIG. 3 depicts a build-time workflow for implementing self-version verification in accordance with certain embodiments of the present disclosure.

FIG. 3 is a flowchart 300 illustrating a workflow performed at the time of building application A of FIG. 1 for enabling the shared library version used by A (i.e., LIB v1) to implement self-version verification according to certain embodiments. Flowchart 300 assumes that this workflow is performed by a "build agent," which may be a human developer of application A or an automated build process that runs on a computer system.

Starting with step 302, the build agent can build/compile a shared library file embodying LIB v1 (LIB.so.1 described previously), where the shared library file includes in its constructor function self-version verification logic for self-verifying that it is the version of shared library LIB that is expected (or in other words, intended to be used) by application A. This self-version verification logic includes, among other things, a hardcoded HMAC name for the HMAC of LIB.so.1 (e.g., HMAC-LIBv1), a hardcoded reference to a predefined HMAC path, and a hardcoded reference to a predefined library path.

At step 304, the build agent can compute an HMAC of the compiled shared library file LIB.so.1 and can assign to this HMAC the HMAC name hardcoded in the file's constructor function (i.e., HMAC-LIBv1). In various embodiments, the computation of the HMAC can involve providing LIB.so.1 and a secret key associated with LIB v1 (called SKEY-LIBv1) to a cryptographic hash function (e.g., SHA256), which causes the hash function to output the HMAC.

Finally, the build agent can configure an installer process of application A to deploy/place HMAC-LIBv1 at the aforementioned predefined HMAC path on a target device where the application has been or will be installed (e.g., computing device 100) (step 306), as well as deploy/place LIB.so.1 at the aforementioned predefined library path on the target device (step 308). For example, in one set of embodiments, the build agent can package HMAC-LIBv1 and LIB.so.1 together into an installable bundle, such that when the installer process installs this bundle on the target device HMAC-LIBv1 and LIB.so.1 will be placed in the predefined HMAC path and the predefined library path respectively. Alternatively, the build agent can configure the installer process to copy HMAC-LIBv1 and LIB.so.1 to the predefined HMAC and library paths from one or more remote sources at the time of installation.

3. Runtime Workflow

Figure 4:
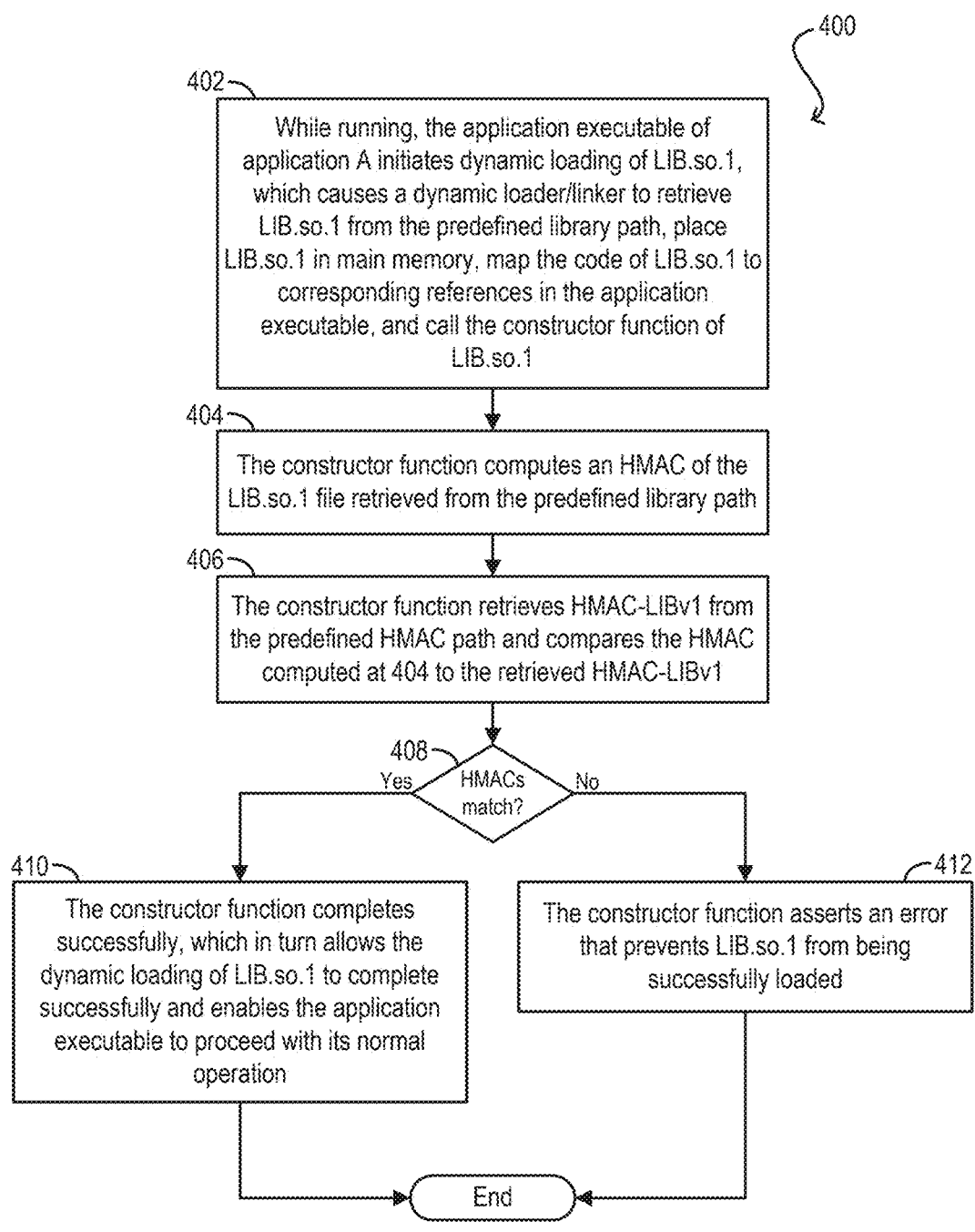
FIG. 4 depicts a runtime workflow for implementing self-version verification in accordance with certain embodiments of the present disclosure.

FIG. 4 is a flowchart 400 illustrating a workflow performed during the runtime of application A (on computing device 100) for carrying out self-version verification of LIB.so.1 according to certain embodiments. Flowchart 400 assumes that LIB.so.1 has been built in accordance with build-time workflow of FIG. 3 and that application A has been installed on computing device 100 (thus causing LIB.so.1 and HMAC-LIBv1 to be present at their predefined path locations on nonvolatile storage 106 of computing device 100).

Starting with step 402, the application executable of application A can initiate dynamic loading of LIB.so.1, which causes the dynamic loader/linker of device 100's OS to retrieve LIB.so.1 from the predefined library path on nonvolatile storage 106, place LIB.so.1 in main memory 104, map the code of LIB.so.1 to corresponding references in the application executable, and invoke the constructor function of LIB.so.1.

Upon being invoked, the constructor function can compute an HMAC on the LIB.so.1 file retrieved from the predefined library path (step 404). The constructor function can perform this computation using the same cryptographic hash function and secret key (SKEY-LIBv1) used at step 304 of the build-time workflow.

The constructor function can then retrieve HMAC-LIBv1 from the predefined HMAC path on nonvolatile storage 106 and compare the HMAC computed at 404 with HMAC-LIBv1 to determine whether they match, or in other words are identical (steps 406 and 408).

If the two HMACs match, that means the LIB.so.1 file present at the predefined library path is identical in content to the LIB.so.1 file created during the build-time workflow for application A, and thus embodies the correct library version expected by A. Accordingly, the constructor function can complete successfully, which in turn allows the dynamic loading of LIB.so.1 to complete successfully and enables the application executable to continue with its normal operation (step 410).

However, if the two HMACs do not match, that means the LIB.so.1 file present at the predefined library path is different from the LIB.so.1 file created during the build-time workflow for application A, and thus is not the correct library version expected by A. In this scenario, the constructor function can assert an error that prevents LIB.so.1 from being successfully loaded (step 412). This error may cause the application to terminate or fall back to a different execution path that does not require use of LIB.so.1.

4. Additional Scenarios

Although the foregoing sections describe the self-version verification techniques of the present disclosure in the context of a single application A and a single shared library version LIB.so.1, these techniques are compatible with scenarios where multiple applications use the same shared library version (or different versions of the same shared library). For example, consider a scenario in which another application B wishes to use LIB v1. In this scenario, the build agent of application B will carry out the build-time workflow shown in FIG. 3, resulting in a shared library file LIB.so.1 and HMAC HMAC-LIBv1 that are identical to the file and HMAC generated by the build agent of application A. If application B is subsequently installed on computing device 100 after application A, application B's installer process will place its LIB.so.1 and HMAC-LIBv1 at the predefined library and HMAC paths respectively, which will overwrite the existing files installed with application A. However, because these files are identical to those installed with application A, this will have no effect on the use of LIB.so.1 by application A.

As another example, consider a scenario in which yet another application C wishes to use a version 2 (rather than version 1) of shared library LIB. In this scenario, the build agent of application C will carry out the build-time workflow shown in FIG. 3, resulting in a shared library file LIB.so.2 and HMAC HMAC-LIBv2 that are different from the files/HMACs generated by the build agents of applications A and B. If application C is subsequently installed on computing device 100 after applications A and B, application C's installer process will place its LIB.so.2 and HMAC-LIBv2 at the predefined library and HMAC paths respectively. This will have no effect on the existing LIB.so.1 and HMAC-LIBv1 present at these paths, and thus all three applications will be able to use their respective shared library versions without issues.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments may have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the present disclosure as set forth in the following claims.

The invention claimed is:

1. A method for implementing self-version verification by a shared library, the method comprising, at a time of building a software application that makes use of a version of the shared library:

building a shared library file that embodies the version of the shared library, wherein the shared library file comprises self-version verification logic in a constructor function, and wherein the self-version verification logic includes a hash-based message authentication code (HMAC) name, a reference to a predefined HMAC path, and a reference to a predefined library path;

computing an HMAC of the shared library file;

assigning to the computed HMAC the HMAC name included in the self-version verification logic;

configuring an installer process of the software application to place the shared library file at the predefined library path on a target device where the software application has been or will be installed; and configuring the installer process to place the computed HMAC at the predefined HMAC path on the target device.

2. The method of claim 1 wherein computing the HMAC of the shared library file comprises:

providing the shared library file and a secret key associated with the version of the shared library as input to a cryptographic hash function, thereby causing the cryptographic hash function to output the HMAC.

3. The method of claim 1 wherein the self-version verification logic in the constructor function is executed while the software application runs on the target device.

4. The method of claim 3 wherein the self-version verification logic in the constructor function is executed at a time the software application initiates dynamic loading of the shared library file.

5. The method of claim 1 wherein the self-version verification logic comprises:

retrieving the shared library file from the predefined library path on the target device;

computing a first HMAC of the retrieved shared library file;

retrieving a second HMAC having the HMAC name from the predefined HMAC path on the target device; and determining whether the first HMAC matches the second HMAC.

6. The method of claim 5 wherein upon determining that the first HMAC matches the second HMAC, the constructor function completes successfully.

7. The method of claim 5 wherein upon determining that the first HMAC does not match the second HMAC, the constructor function asserts an error that prevents the software application from successfully loading the shared library file.

8. The method of claim 1 wherein configuring the installer process to place the shared library file at the predefined library path and to place the computed HMAC at the predefined HMAC path comprises:

packaging the shared library file and the computed HMAC into an installable bundle, such that when the installable bundle is installed on the target device the shared library file and the computed HMAC are placed at the predefined library path and the predefined HMAC path respectively.

9. The method of claim 1 wherein configuring the installer process to place the shared library file at the predefined library path and to place the computed HMAC at the predefined HMAC path comprises:

at a time of installing the software application on the target device, causing the installer process to copy the shared library file and the computed HMAC to the predefined library path and the predefined HMAC path respectively.

10. The method of claim 1 wherein the software application is another shared library that makes use of the version of the shared library.

11. A computer system comprising:

one or more processors; and a non-transitory computer readable storage medium having stored thereon program code that, when executed by the one or more processors, causes the one or more processors to:

build a shared library file that embodies the version of the shared library, wherein the shared library file comprises self-version verification logic in a constructor function, and wherein the self-version verification logic includes a hash-based message authentication code (HMAC) name, a reference to a predefined HMAC path, and a reference to a predefined library path;

compute an HMAC of the shared library file;

assign to the computed HMAC the HMAC name included in the self-version verification logic;

configure an installer process of the software application to place the shared library file at the predefined library path on a target device where the software application has been or will be installed; and configure the installer process to place the computed HMAC at the predefined HMAC path on the target device.

12. The computer system of claim 11 wherein computing the HMAC of the shared library file comprises:

providing the shared library file and a secret key associated with the version of the shared library as input to a cryptographic hash function, thereby causing the cryptographic hash function to output the HMAC.

13. The computer system of claim 11 wherein the self-version verification logic in the constructor function is executed while the software application runs on the target device.

14. The computer system of claim 11 wherein the self-version verification logic comprises:

retrieving the shared library file from the predefined library path on the target device;

computing a first HMAC of the retrieved shared library file;

retrieving a second HMAC having the HMAC name included in the self-version verification logic from the predefined HMAC path on the target device; and determining whether the first HMAC matches the second HMAC.

15. The computer system of claim 14 wherein upon determining that the first HMAC matches the second HMAC, the constructor function completes successfully.

16. The computer system of claim 14 wherein upon determining that the first HMAC does not match the second HMAC, the constructor function asserts an error that prevents the software application from successfully loading the shared library file.

17. The computer system of claim 11 wherein configuring the installer process to place the shared library file at the predefined library path and to place the computed HMAC at the predefined HMAC path comprises:

packaging the shared library file and the computed HMAC into an installable bundle, such that when the installable bundle is installed on the target device the shared library file and the computed HMAC are placed at the predefined library path and the predefined HMAC path respectively.

18. The computer system of claim 11 wherein configuring the installer process to place the shared library file at the predefined library path and to place the computed HMAC at the predefined HMAC path comprises:

at a time of installing the software application on the target device, causing the installer process to copy the shared library file and the computed HMAC to the predefined library path and the predefined HMAC path respectively.

19. A method for implementing self-version verification by a shared library, the method comprising, at a time of building a software application that makes use of a version of the shared library:

building a shared library file that embodies the version of the shared library, wherein the shared library file comprises self-version verification logic, and wherein the self-version verification logic includes a cryptographic primitive or mathematical digest name, a reference to a predefined primitive or digest path, and a reference to a predefined library path;

computing a cryptographic primitive or mathematical digest of the shared library file;

assigning to the computed cryptographic primitive or mathematical digest the cryptographic primitive or mathematical digest name included in the self-version verification logic;

configuring an installer process of the software application to place the shared library file at the predefined library path on a target device where the software application has been or will be installed; and configuring the installer process to place the computed cryptographic primitive or mathematical digest at the predefined primitive or digest path on the target device.

20. The method of claim 19 wherein the cryptographic primitive or mathematical digest is a hash, a hash-based message authentication code (HMAC), or a digital signature.

* * * * *